United States Patent [19]

Salvo

[11] Patent Number: 5,560,631
[45] Date of Patent: Oct. 1, 1996

[54] TRAILER HITCH COVER

[76] Inventor: Ronald F. Salvo, 2059 Georgetown Blvd., Ann Arbor, Mich. 48105

[21] Appl. No.: 459,745

[22] Filed: Jun. 2, 1995

[51] Int. Cl.$^6$ .................................................. B60R 27/00
[52] U.S. Cl. ............................................................ 280/507
[58] Field of Search .................................. 280/507, 504, 280/432; 150/166

[56] References Cited

U.S. PATENT DOCUMENTS

| D. 340,901 | 11/1993 | Smith et al. | D12/169 |
|---|---|---|---|
| D. 349,083 | 7/1994 | Hall | D12/162 |
| 3,614,136 | 10/1971 | Dent | 280/500 |
| 3,774,952 | 11/1973 | Zorn | 293/69 R |
| 4,040,641 | 8/1977 | Riecke | 280/507 |
| 4,852,902 | 8/1989 | Young et al. | 280/507 |

FOREIGN PATENT DOCUMENTS 2257100  1/1993  United Kingdom ................... 280/507

*Primary Examiner*—Kevin T. Hurley
*Attorney, Agent, or Firm*—Gifford, Krass, Groh, Sprinkle, Patmore, Anderson & Citkowski

[57] ABSTRACT

A cover for a receiver-type trailer hitch includes a first panel which visually masks upwardly facing portions of the hitch assembly, a second panel which masks rearwardly facing portions of the assembly, and means are further provided for holding the cover in place. In the preferred embodiment, the first and second panels are joined at right angles to one another, and both are shaped to tightly conform dimensionally to receiver-type hitches having central, rearwardly projecting draw tubes. The panels are preferably constructed of a relatively thin, substantially rigid material such as molded plastic. Various means are disclosed for holding the cover in place, including bolts with hand-operated fasteners, hook-and-loop fasteners, magnets and straps. The cover accommodates various hitch assemblies having different class ratings, and score marks on inwardly facing surfaces are provided to trim right and left ends of the cover to adjust the width of the cover to ensure that it fits snugly between two vertical plates typically associated with the mounting of the hitch assembly.

20 Claims, 3 Drawing Sheets

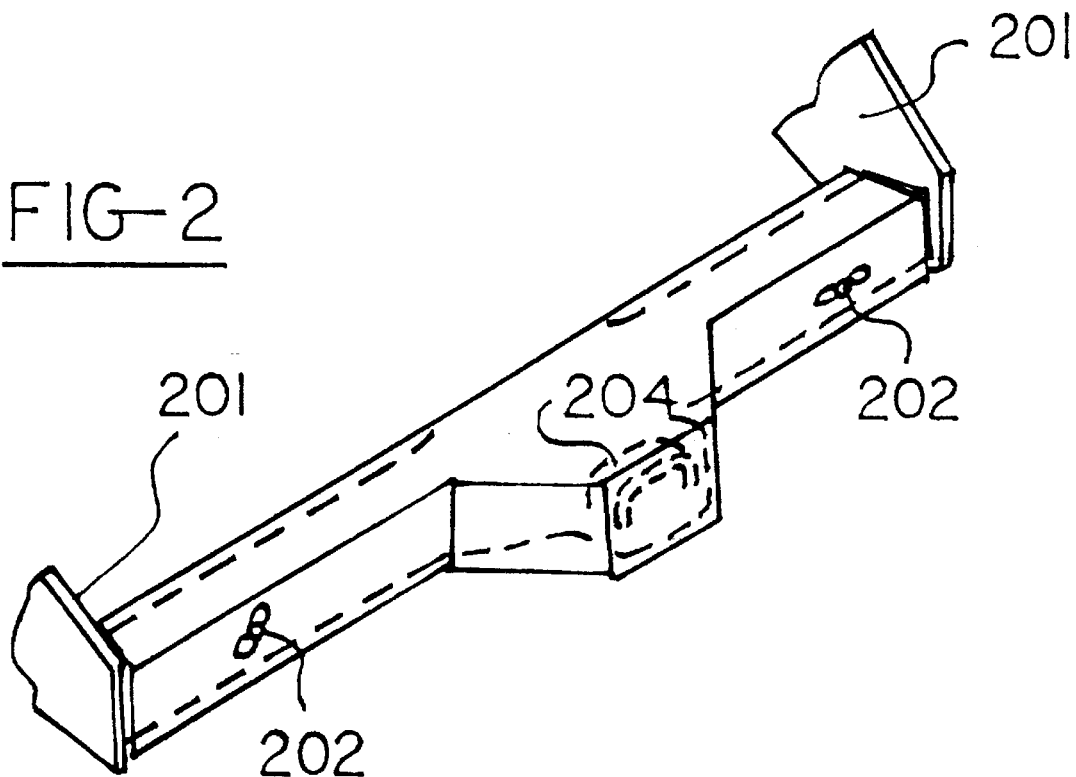
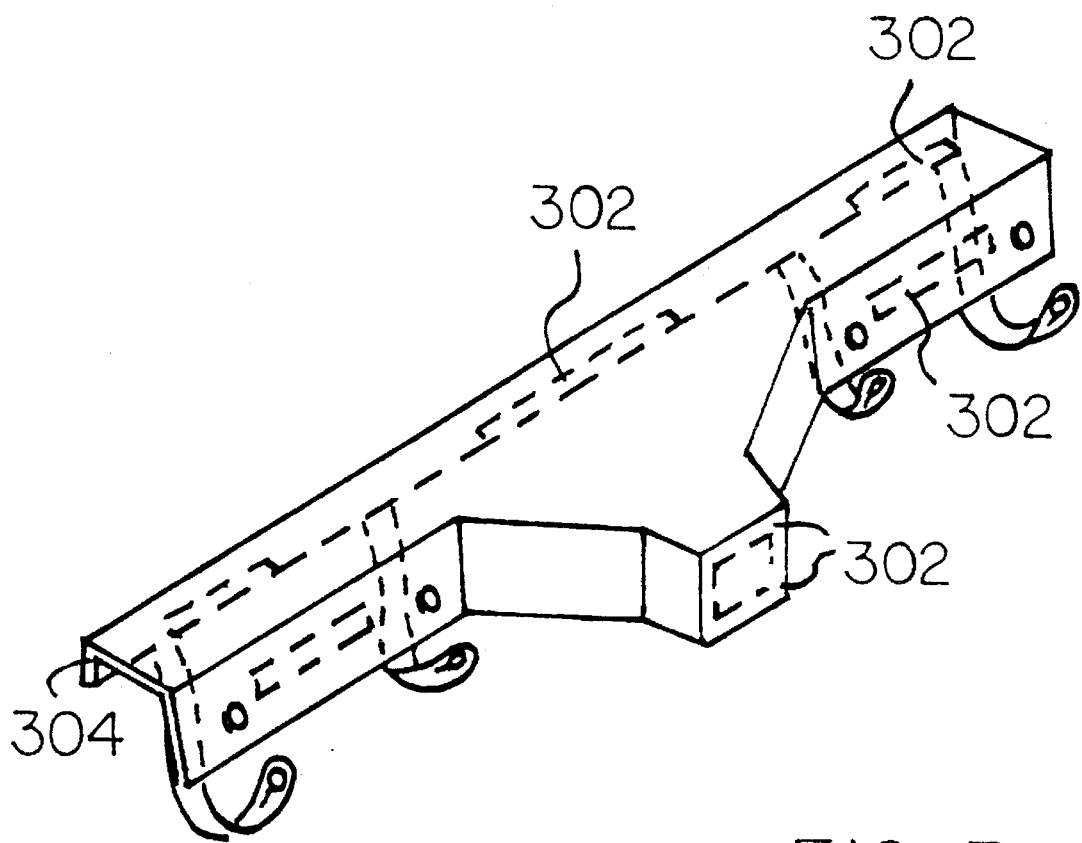

TRAILER HITCH COVER

FIELD OF THE INVENTION

The present invention relates generally to protective and decorative coverings, and, in particular, to such coverings for use in vehicular applications. More specifically, the invention relates to coverings associated with towing apparatus such as receiver hitches, and the like.

BACKGROUND OF THE INVENTION

A wide variety of options are available for use in vehicle towing situations. Such devices, which may either be factory-installed or available as after-market add-on type equipment, range from lightweight bumper-mounted ball hitches to very heavy-duty trailer hitches, tow bars, and so forth. An introduction to available options may be gathered from the catalog of Valley Industries Inc., a supplier of such equipment based in Lodi, Calif. Other manufacturers also offer comparable items.

Trailer hitches are divided into four classes in accordance with gross trailer weight (GTW) and trailer tongue weight (TW), these two measures together defining what is termed maximum load capacity. Gross trailer weight is the total weight of the .trailer under fully loaded conditions, whereas trailer tongue weight is the downward pressure which a fully loaded trailer exerts on a hitch ball. Maximum load capacity varies from 2000 lbs. to 10,000 lbs. (GTW) from Class I to Class IV, with TW ranging from 200 lbs. up to 1000 lbs., depending upon class. Vehicle manufacturers also typically specify a maximum towing capacity associated with the total weight that a particular vehicle is designed to pull.

Class I and Class II hitches may either take the form of fixed drawbar or receiver styles, the former simply providing a lug for ball mounting, the latter including a receiver opening or "draw tube" to accept a ball mount as well as other attachments, including weight distributing hitches, tow bars, and so forth. Class III and IV hitches are typically only provided in the receiver style. Additionally, whereas the receiver opening of Class I and II hitches measures 1¼ inches square (ID), Class III and IV hitches use a two-inch square opening.

Although Class Ill and IV hitches are not recommended for mid-size cars, these more substantial hitches are applicable to pick-ups, sport utility vehicles and vans. Accordingly, such hitches have become more popular along with the rising popularity of 4-wheel-drive vehicles. Structurally, using a Class Ill/IV receiver hitch as an example, the unit includes a horizontal bar mounted width-wise with respect to the vehicle and under the rear bumper. Typically this bar does not extend rearwardly past the vehicle bumper, but may do so, depending upon the circumstances associated with mounting. The receiver opening or draw tube is welded transversely and centrally with respect to this bar, which is further secured in place using upper and lower support plates. FIG. 1 illustrates a typical Class Ill/IV receiver-style hitch.

A brand new hitch in pristine condition may be attractive in appearance, and may be a source of pride to the owner. However, through months of use and/or exposure to the elements, the assembly, being constructed of painted steel, will typically rust and become dirty and unsightly. Accordingly, there has arisen a need to cover some or all of such a device, not only for the purpose of protection, but also to render an attractive or decorative appearance. U.S. Pat. No. D349,083 claims the ornamental features associated with a two-piece trailer hitch cover. When installed, with this invention, the rearward facing portions of the central bar are covered, but the draw tube and upper and lower support plates are left exposed. Although this particular design allows the cover to remain in place during use, it presents certain drawbacks. For one, the cover comes in two pieces, which must be accounted for along with mounting hardware, and, additionally since the two cover halves remain in place during use, information concerning maximum weight limits, and so forth is obscured which might result in misuse or liability. Another related towing hitch of covering is disclosed in U.S. Pat. No. 4,852,902. However, this covering is limited to an extension piece mounted to the hitch proper, and thus does not solve any problems associated with obscuring covering the main assembly of a typical receiver hitch.

SUMMARY OF THE INVENTION

The present invention avoids the shortcomings of the prior art by providing a unitary receiver hitch cover which effectively masks all otherwise visible portions of the hitch assembly, including the main horizontal bar, draw tube and upper and lower support plates. The invention facilitates this coverage by providing a structure formed of rigid or semi-rigid sheet material such as a molded plastic, having an upper panel dimensionally sized to cover the upwardly facing surfaces of the hitch assembly, and a rear skirt portion. Preferably the rear skirt portion is at all points formed at a right angle with respect to the upper panel. Also in the preferred embodiment, the upper panel and skirt portion assume a generally trapezoidal shape midway through the structure, enabling the cover to conform to the centralized portions of the hitch, including the draw tube and associated support plates. The preferred embodiment also includes score marks on the sides of the panels facing the hitch when installed, enabling the right and left ends of the structure to be straightforwardly trimmed to accommodate different hitch classes and styles.

In terms of attachment, various alternatives are disclosed, including the use of thumb screws or the like in conjunction with holes drilled through the horizontal bar through which associated bolts are inserted. Alternatively, various other attachment systems may be used, including magnets adhered to the inside surfaces of the panels, taking advantage of the fact that such trailer hitches are built of a ferrous material, typically steel. Straps which wrap around the horizontal bar of the hitch assembly may also be provided which mate with molded fasteners on the rear panel(s). Alternative embodiments of the invention further provide optional structural components to assist in stabilizing the cover in place, including a protrusion to be received by the receiver tube, and a lip overhanging at least a portion of the front part of the horizontal bar. As a further option, vibration dampening inserts may be used to minimize any rattle of the cover while the vehicle is in motion.

BRIEF DESCRIPTION OF THE DRAWINGS

FIG. 2 is an oblique drawing showing a cover according to the invention in place, with the trailer hitch being depicted in phantom-line form, this figure also showing a thumb screw type of fastening arrangement;

FIG. 3 is an oblique drawing of an alternative embodiment of the invention used to illustrate a forward lip and magnets or hook-and-loop type fasteners, depicted with broken lines, used as an alterative fastening arrangement;

DETAILED DESCRIPTION OF THE PREFERRED EMBODIMENTS

Figure 1:
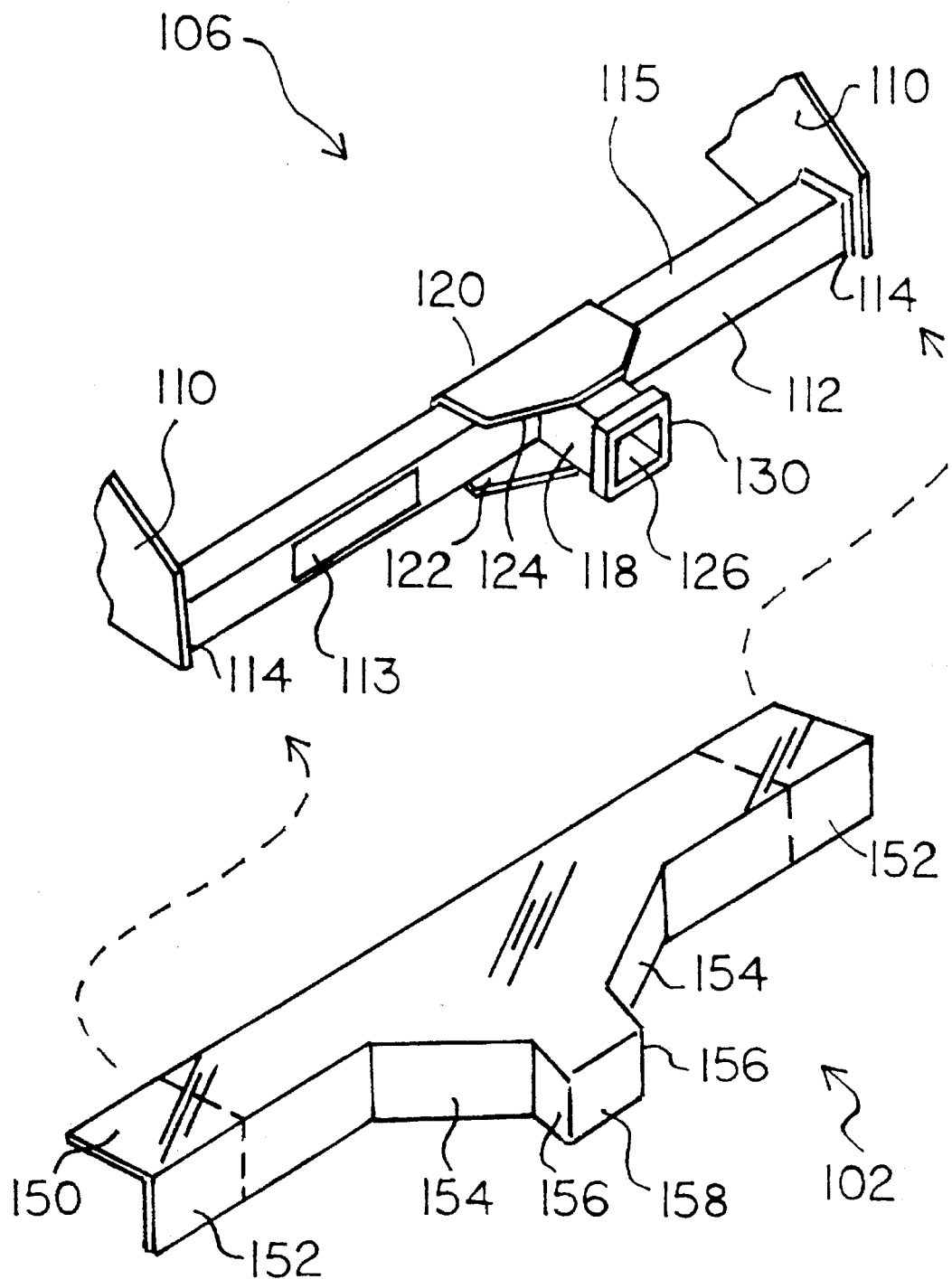
FIG. 1 is an oblique drawing of a receiver-type hitch assembly to which the present invention is applicable, this illustration further including a cover formed according to the invention having been removed from the hitch assembly.
Figure 4A:
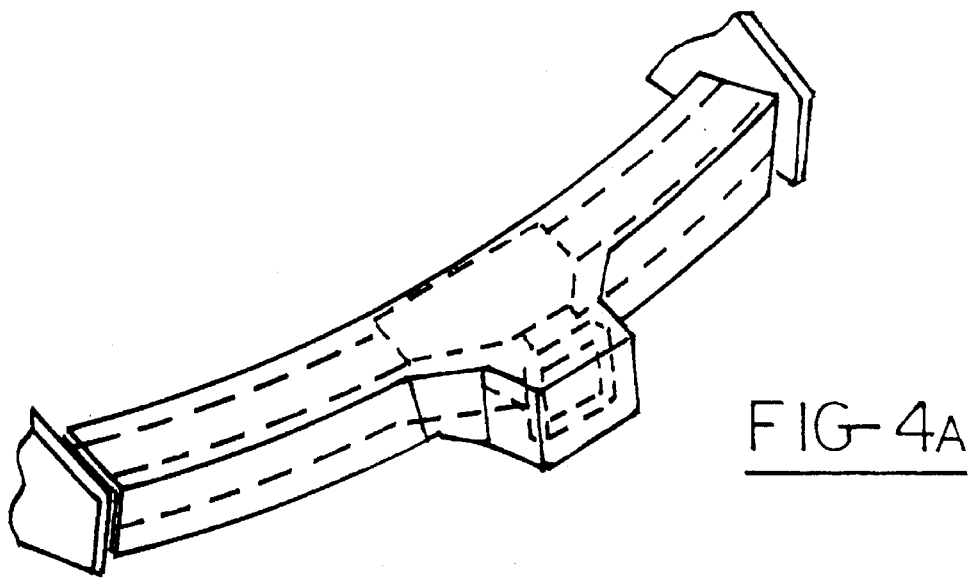
FIG. 4A is an oblique drawing of an alternative configuration of the invention for use with a curved crossbar.
Figure 4B:
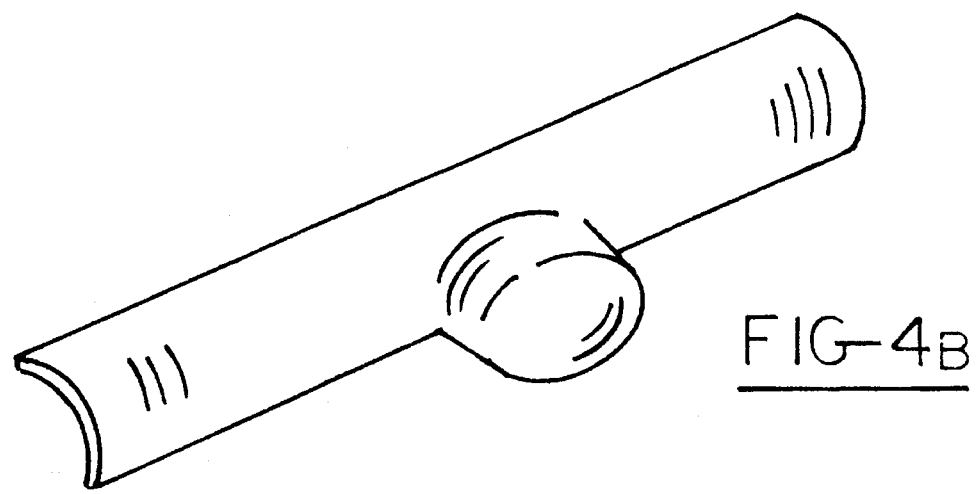
FIG. 4B is an oblique drawing of yet a further alternative configuration of the invention.
Figure 4C:
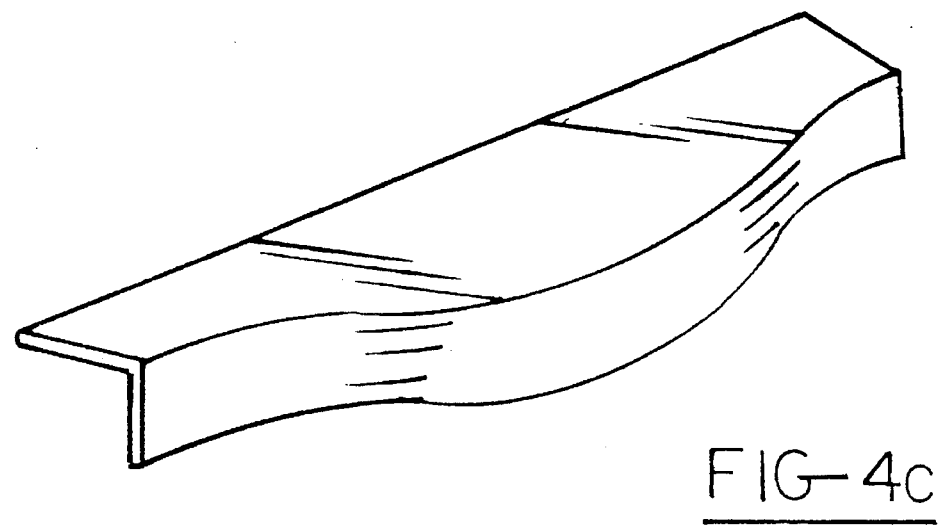
FIG. 4C is an oblique drawing of a still further alternative configuration of the invention.

FIG. 1 shows a typical trailer hitch to which the present invention is applicable, in this case a Type III hitch, though the invention is generally applicable to all other class hitches as well. The hitch of FIG. 1, depicted generally at 106, includes a primary horizontal bar 115 supported beneath a rearward section of the vehicle, typically under the rear bumper. This primary bar 115 is welded at either end in the vicinity of 114 to two vertically oriented side plates 110 which are bent to form brackets (not shown) having holes which are used for the actual mounting to the underside of the vehicle.

At a point midway along the length of bar 115, there is mounted a receiver assembly consisting of a draw tube 118 welded transversely with respect to the primary bar 115, and typically having a rearwardly facing opening 126 around which there is disposed a collar 130. In addition to weldment between the draw tube 118 and the rearward facing face of the primary bar member 115, upper and lower support plates, 120 and 122, respectively, are typically additionally welded to the primary bar 115 and draw tube 118 as shown, to provide an additional level of structural support. The lower plate 122 typically also includes holes 124 on either side, though only such hole is visible in the figure, which are ordinarily used for safety chains in the event that the draw tube mechanism itself fails for whatever reason. Although the top portion of the hitch 106 may be visible if one crouches down, when mounted under the rear bumper area of a vehicle, ordinarily the most visible portion of the assembly, in addition to the draw tube itself, are rearward facing surfaces 112 of the bar 115. Accordingly, it is customary to affix use-related information on this rear surface 112, including load limits and so forth, which are often located in the vicinity of 113.

A cover according to the invention is depicted generally at 102. Constructed of a rigid or semi-rigid material, preferably unbreakable plastic material such as molded ABS in a thickness range of ¼ to ⅜-inch, the cover consists of an upper panel 150 which covers the upwardly facing sections of the trailer hitch assembly, including the upper surfaces of the primary bar 115, the upper plate 120, and the upwardly facing extend of the draw tube 118, including the collar 130. Extending away from this upper panel 150, preferably at right angles with respect thereto, is one or more panels associated with covering rearward surfaces of the hitch assembly. Although in one embodiment a single panel may be used to cover rearware facing surfaces, for example formed at a right angle with respect to the upper panel, resulting in elongate member having a consistent L-shaped transverse cross-section. In the preferred embodiment, right and left panels 152 are provided which cover the rearward facing portions of the primary bar 115, as well as panels 156 and 158, which are generally associated with covering the furthest extending portion of the draw tube itself. Between the closest vertical edges associated with panels 152 and 156, are panels 154, which generally conform to the trapezoidal shape edges of the plates 120 and 122, thus covering and concealing those sections of the assembly associated with the connection between the draw tube 118 and the primary bar 115. The broken lines and arrows in FIG. 1 show how the inventive cover 102 is placed on the hitch assembly 106, though, based upon its overall conformal shape, correct orientation is easily implied.

In place, the cover 102 fits neatly on either end, preferably between the two side plates 110. In order to accommodate different width hitch assemblies, including hitches available from different manufacturers different class ratings, and so forth, score lines 160 are provided on the inwardly facing surfaces of the cover to assist the purchaser in trimming the cover in the event that it needs to be made less wide, depending upon the circumstances.

FIG. 2 shows the cover properly installed over a Type III receiver hitch depicted in phantom-line form, with the width-wise extent of the cover neatly interfacing against the vertical side plates 201. FIG. 2 also shows one optional means for holding the cover in place on the primary horizontal bar, in this case, thumb screws 202, which are tightened onto bolts (not shown), which, in turn, are received by holes drilled into the primary horizontal bar after purchase. As an alternative to bolts and thumb screws, the use of an expanding type of plug may also be used in place of the nut/bolt combination, which offers the advantage that the purchaser need only to drill through the first rearward facing surface of the horizontal bar, as opposed to all the way through both vertical surfaces of the bar, as would otherwise be required to insert a bolt therethrough. FIG. 2 further illustrates the use of an optional protrusion 204 which is bonded or molded to the inwardly facing surface of panel 158, the purpose of this protrusion being to enter at least a portion of the draw tube opening 126, thereby providing some additional stabilization and holding power.

FIG. 3 shows yet a further optional means whereby the cover may be held onto the hitch, in this case through the use of magnets 302, which may alternatively be placed in any or all of the areas depicted in broken-line form. As an alternative to magnets a hook-and-loop type fastening system such as Velcro® may also be used. In the case of magnets, they are preferably of the flexible ceramic type, and may be glued to the inward facing walls of the panels of the cover, and hold the cover directly to the primary horizontal bar, upper support plate, or rearward facing perimeter of the draw tube. The magnet placements of FIG. 3 are by no means exhaustive, and more or fewer such magnets of varying type may be placed in these and other locations, depending upon the circumstances. In the case of hook-and-loop fastening, self-adhesive strips are preferably used and may be located in preicsely the same place as 302 depicted with respect to magnets, though, of course, with hook-and-loop fastening, one type of strip would be adhered to the hitch assembly itself, whereas the mating strip would be fastened to the inner wall of the upper panel, rearward panel, or with respect to both upper and rearward-facing panels. For further security, straps 310 may be provided alone or in combination with any of the attachment systems so far described. Regardless of the attachment mechanism used, FIG. 3 also shows the inclusion of a forward lip 304 which may be used not only to act against a longitudinal bending moment applied to the cover, but also help keep the cover in place, particularly if such a lip 304 acts to prevent gusts of air during vehicle operation from entering the spaces between the cover and the hitch, tending to pull it off.

Having thus described my invention, I claim:

1. A cover for a trailer hitch assembly of the receiver type having a rearwardly projecting draw tube, the assembly including a transversely extending primary bar member having upwardly and rearwardly facing surfaces, the cover comprising:

a first panel oriented horizontally and having a rearward edge, the first panel substantially visually masking the upwardly facing portions of the assembly;

a second panel having an upper edge joined to the rearward edge of the first panel, the second panel substantially visually masking the rearwardly facing portions of the assembly; and means to hold the cover in place.

2. The cover of claim 1, the means to hold the cover in place including:

one or more bolts insertable through the second panel and holes formed in the rearwardly facing surface of the hitch assembly; and a hand-operated fastener associated with each bolt.

3. The cover of claim 1, the means to hold the cover in place including one or more magnets bonded to the surface of the cover facing the hitch assembly.

4. The cover of claim 1, the means to hold the cover in place including one or more hook-and-loop type fasteners between the surface of the hitch assembly and the surface of the cover facing the hitch assembly.

5. The cover of claim 1, the means to hold the cover in place including at least one strap which wraps around a portion of the hitch assembly.

6. The cover of claim 1, the first and second panels being joined at right angles to one another.

7. The cover of claim 1, the first and second panels being shaped to substantially conform to the surfaces of the hitch assembly immediately therebeneath.

8. The cover of claim 1, including a Class II type receiver hitch.

9. The cover of claim 1, including a Class III type receiver hitch.

10. The cover of claim 1, including a Class IV type receiver hitch.

11. For a receiver hitch assembly having upwardly facing surfaces and rearwardly facing surfaces associated with components disposed between two sideplates, a protective cover, comprising:

an elongated member having a length sized to fit between the two vertical sideplates, the member having a first panel which, when fitted in place, substantially visually obscures the upwardly facing surfaces of the assembly, and a second panel which substantially visually obscures the rearwardly facing surfaces of the assembly.

12. The protective cover of claim 11, wherein the first and second panels are secured to each other.

13. The protective cover of claim 12, wherein the first and second panels are in perpendicular alignment.

14. The protective cover of claim 11, wherein the first panel conforms generally to the upwardly facing surfaces of the receiver hitch and the second panel of the protective cover conforms generally to the rearward facing surfaces of the receiver hitch assembly.

15. The protective cover of claim 11, further including score marks on opposing ends to assist in trimming the length.

16. The protective cover of claim 11, including means for releasably securing the cover to the receiver hitch assembly.

17. The protective cover of claim 14, wherein the rearwardly facing surfaces of the hitch assembly include a draw tube.

18. A cover for a receiver-style trailer hitch assembly of the type including a transverse bar portion and a draw tube projecting rearwardly therefrom, the assembly having upwardly and rearwardly facing appearances, the cover comprising:

an elongated sheet of material having a lengthwise bend defining first and second panel portions dimensionally sufficient to cover and visually mask, respectively, the upwardly and rearwardly facing appearances of the transverse bar portion of the hitch assembly;

the material further including an integral bulbous section located midway along its length, the dimensions of the bulbous section being sufficient to cover and visually mask the draw tube; and mean to attach the cover to the hitch assembly.

19. The cover of claim 18 wherein the bend is gradual and continuous.

20. The cover of claim 18 wherein the first and second panels are at right angles to one another.

* * * * *